United States Patent Office 3,729,567
Patented Apr. 24, 1973

---

3,729,567
1,1,5-TRIHYDRO-PERFLUOROPENTANE AS AN INHALATION ANESTHETIC
Ross C. Terrell, Plainfield, N.J., assignor to Airco, Inc., New York, N.Y.
No Drawing. Filed July 15, 1971, Ser. No. 163,102
Int. Cl. A61k 27/00
U.S. Cl. 424—350      2 Claims

---

The novel compound 1,1,5 - trihydro-perfluoropentane having the formula $CHF_2(CF_2)_3CH_2F$ is disclosed. This compound is useful as an inhalation anesthetic and as a solvent and dispersant for fluorinated materials.

---

This invention relates to the compound 1,1,5-trihydro-perfluoropentane, and its use in producing anesthesia in anesthetic-susceptible, air-breathing mammals.

The compound 1,1,5-trihydro-perfluoropentane has the following formula:

$$CHF_2(CF_2)_3CH_2F$$

This compound is normally a clear, colorless liquid and has the following physical properties: boiling point 82.5° C.; vapor pressure 90 mm. at 25° C.; specific gravity 1.4; and molecular weight 234.

The product 1,1,5-trihydro-perfluoropentane is soda lime stable and an anesthetic for anestheic-susceptible mammals. This compound is also easily miscible with other organic liquids including fats and oils and has useful solvent properties, for example, as a solvent for fluorinated olefins and other fluorinated materials such as fluoro waxes. The compound of this invention may be used to prepare pastes and dispersions of such materials useful for coatings and the like, and may be used as a degreasing agent.

The following examples will illustrate the preparation and use of the novel compound of this invention.

$$CHF_2(CF_2)_3CH_2F$$

Potassium fluoride (90 g.) was added to N-methyl pyrrolidone (600 ml.) and the mixture dried by distilling out 100 ml. of the solvent. The tosylate of 1-H, 1-H, 5-H-perfluoropentanol ($CHF_2CF_2CF_2CF_2CH_2OTs$) (288 g.) was then added slowly while keeping the reaction temperature at 190–200° C. The product (127 g.) was distilled out as formed and was purified by fractional distillation. The product was non-flammable and analyzed as follows:

$C_5H_3F_9$—Calculated (percent): F, 73.0. Found (percent): F, 72.8.

In order to determine the potency of 1,1,5-trihydro-perfluoropentane as an inhalation anesthetic in combination with oxygen, tests were carried out on mice. The product used was at least 99.5% pure as determined by vapor phase chromatography.

In the tests, 1,1,5-trihydro-perfluoropentane is administered to test mice by a standard procedure in which a measured quantity of the agent is placed in a laboratory jar and allowed to completely evaporate so as to give a calculated vapor concentration. The test mice are then quickly placed in the jar and observed. Anesthesia is determined by observing the righting reflex of the mice.

In such tests the 1,1,5-trihydro-perfluoropentane induced a very light anesthesia in the mice in 58 seconds at 4% vapor concentration. Moderate excitement was observed in the induction. Recovery required 40 seconds. Recovery time is measured beginning when the mice are transferred from the test jar to room air and ending when the mice are observed to be able to walk. At 5% vapor concentration essentially the same effects were observed but there was also some depression in the respiration of the mice. Induction required 45 seconds at this concentration and recovery required 1 minute 20 seconds. At 6% vapor concentration the respiration rate fell to 40 per minute. Induction was fairly smooth and required 55 seconds; recovery was uneventful and took 2 minutes and 18 seconds.

The compound 1,1,5-trihydro-perfluoropentane is a mild anesthetic whose use is particularly desirable where better control over the patient is desired or the amount of anesthetic administered is not regulated exactly. The anesthetic agent of the invention may be administered by any of the well known techniques used for the administration of general inhalation agents, such as the open drop, semiclosed, and closed systems. The agents may also be administered as an injectable anesthetic as taught by John C. Krantz, Jr., in U.S. Patent 3,216,897, issued Nov. 9, 1965 and assigned to the assignee of the instant application.

The compound of this invention lends itself to effective use as an inhalant anesthetic in respirable mixtures containing life-supporting concentrations of oxygen as well as mixtures containing oxygen and other inhalation anesthetics such as nitrous oxide. The effective amount of the compound of this invention to be employed depends on the level of anesthesia to which the mammal is to be brought, the rate at which anesthesia is to be induced, and the length of time over which anesthesia is to be maintained. Minor volume percentages of the compound in oxygen from several percent, for instance at least about 4%, up to about 10% can be employed. The amount of anesthesia to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

While there has been described what are at present considered to be the preferred embodiments of the invention, it will be understood that various modifications may be made therein which are within the true spirit and scope of the invention.

I claim:
1. An inhalant anesthetic composition comprising 1,1,5-trihydro-perfluoropentane in admixture with oxygen in suitable proportions for anesthesia.
2. A method of anesthetizing an inhalation anesthetic-susceptible mammal which comprises administering to said mammal by inhalation an effective, anesthetic amount of 1,1,5-trihydro-perfluoropentane along with sufficient oxygen to support life.

References Cited

Chemical Abstracts 56: 8198h to 8199a (1962).

JEROME D. GOLDBERG, Primary Examiner